(12) United States Patent
Marks

(10) Patent No.: US 9,648,926 B2
(45) Date of Patent: May 16, 2017

(54) FOOTWEAR RECOMMENDATIONS FROM FOOT SCAN DATA DESCRIBING FEET OF A USER

(71) Applicant: William H. Marks, Delray Beach, FL (US)

(72) Inventor: William H. Marks, Delray Beach, FL (US)

(*) Notice: Subject to any disclaimer, the term of this patent is extended or adjusted under 35 U.S.C. 154(b) by 125 days.

(21) Appl. No.: 14/494,202

(22) Filed: Sep. 23, 2014

(65) Prior Publication Data

US 2016/0081435 A1    Mar. 24, 2016

(51) Int. Cl.
*A43D 1/02* (2006.01)
*H04N 13/02* (2006.01)
*G06Q 30/06* (2012.01)

(52) U.S. Cl.
CPC .............. *A43D 1/025* (2013.01); *A43D 1/02* (2013.01); *A43D 1/027* (2013.01); *G06Q 30/0631* (2013.01); *H04N 13/0275* (2013.01)

(58) Field of Classification Search
CPC .......... A43D 1/025; A43D 1/027; G06N 5/04; H04N 13/0275
See application file for complete search history.

(56) References Cited

U.S. PATENT DOCUMENTS

| | | |
|---|---|---|
| 5,128,880 A | 7/1992 | White |
| 5,164,793 A | 11/1992 | Wolfersberger et al. |
| 5,206,804 A * | 4/1993 | Thies ................. A43D 119/00 705/26.7 |
| 5,477,371 A | 12/1995 | Shafir |
| 6,343,276 B1 | 1/2002 | Barnett |
| 6,473,667 B1 | 10/2002 | Lee |

(Continued)

FOREIGN PATENT DOCUMENTS

| | | |
|---|---|---|
| EP | 2717731 | 4/2014 |
| WO | WO2008070537 | 6/2008 |

(Continued)

OTHER PUBLICATIONS

Wang, Chung-Shing. "An analysis and evaluation of fitness for shoe lasts and human feet." Computers in Industry 61.6 (2010): 532-540.*

(Continued)

*Primary Examiner* — Andrew W Johns
*Assistant Examiner* — Menatoallah Youssef
(74) *Attorney, Agent, or Firm* — K&L Gates LLP

(57) ABSTRACT

Techniques for recommending footwear based on scan data describing feet of a user and a variety of other information are described. In some instances, a footwear service may obtain scan data describing feet of a user. The footwear service may process the scan data to generate a 3D representation of the user's feet, such as a 3D model or other representation. The footwear service may also obtain other information about the user, such as user preferences, orthotics data, information identifying an activity that the user participates in and so on. The footwear service may determine a footwear recommendation for the user based on the 3D representation of the user's feet, footwear data describing a footwear item, the user preferences and/or other information.

22 Claims, 8 Drawing Sheets

(56) References Cited

U.S. PATENT DOCUMENTS

| | | | |
|---|---|---|---|
| 6,741,728 B1* | 5/2004 | Genest | A43D 1/02 382/115 |
| 6,954,557 B2 | 10/2005 | Kim et al. | |
| 7,706,028 B2 | 4/2010 | Pishdadian et al. | |
| 8,348,371 B2 | 1/2013 | McDowell et al. | |
| 8,521,616 B2 | 8/2013 | End et al. | |
| 9,366,530 B2 | 6/2016 | Wilkinson et al. | |
| 2002/0023087 A1 | 2/2002 | Vickery et al. | |
| 2007/0011173 A1* | 1/2007 | Agostino | A43D 1/02 |
| 2008/0083416 A1* | 4/2008 | Xia | A43B 7/142 132/200 |
| 2009/0287452 A1 | 11/2009 | Stanley et al. | |
| 2010/0293076 A1 | 11/2010 | End et al. | |
| 2011/0055053 A1 | 3/2011 | Rutschmann | |
| 2012/0316827 A1 | 12/2012 | Wilkinson et al. | |
| 2012/0316985 A1 | 12/2012 | Wilkinson et al. | |
| 2013/0191240 A1 | 7/2013 | Lasry | |
| 2014/0032369 A1 | 1/2014 | End et al. | |
| 2015/0161707 A1 | 6/2015 | Wilkinson et al. | |
| 2015/0242929 A1 | 8/2015 | Wilkinson et al. | |

FOREIGN PATENT DOCUMENTS

| | | | |
|---|---|---|---|
| WO | WO 2008070537 A2 * | 6/2008 | A43D 1/025 |
| WO | WO2012170884 | 12/2012 | |
| WO | WO2015127418 | 8/2015 | |

OTHER PUBLICATIONS

PCT Search Report and Written Opinion mailed Dec. 22, 2015 for PCT application No. PCT/US15/51720, 9 pages.

Canfit, "Retail Matching Software", retrieved on Sep. 17, 2014 at <<www.vorum.com>>, 1 page.

"FootWare Matching System", retrieved on Sep. 16, 2014 at <<http://www.vorum.com/english/footware/matching-system.php>>, 3 pages.

"Gizmag", retrieved on Sep. 16, 2014 at <<http://www.gizmag.com/>>, 6 Pages.

Hogan, "Photonics Spectra", retrieved on Sep. 16, 2014 at <<http://www.photonics.com/Article.aspxAid=31310>>, 3 pages.

Landry, "The 6 Winners Who Walked Away With Their Share of $50K From Harvard's i3 Challenge", retrieved on Mar. 12, 2014 at <<http://bostinno.streetwise.co/all-series/the-6-winners-who-walked-away-with-their-share-of-50k-from-harvards-i3-challenge/>>, BostInno, Mar. 30, 2012, 4 Pages.

"m-tailor", retrieved on Jul. 21, 2014 at <<http://www.m-tailor.com/>>, 1 page.

"New Balance Pushes the Limits of Innovation with 3D Printing", retrieved on Sep. 16, 2014 at <<http://www.newbalance.com/press-releases/id/press_2013_New_Balance_Pushes_Limits_of_Innovation_with_3D_Printing.html>>, 2 pages.

"Nike Changes Football Boots Forever with New Magista", retrieved on Sep. 16, 2014 at <<http://nikeinc.com/news/nike-changes-football-boots-forever-with-new-magista>>, 8 pages.

Perry, "Ideas Galore", retrieved on Mar. 12, 2014 at <<http://news.harvard.edu/gazette/story/2012/04/ideas-galore/>>, harvard gazette, Apr. 3, 2012, 3 Pages.

Rout, et al. "3D Foot Scan to Custom Shoe Last", Special Issue of IJCCT vol. 1 Issue 2, 3, 4, 2010 for International Conference <ACCTA-2010>, Aug. 3-5, 2010, 5 pages.

"Shoefitr", retrieved on Sep. 16, 2014 at <<http://www.shoefitr.com/index.php>>, 3 pages.

"The Pros and Cons of Computerized Foot Orthotic Technology", retrieved on Sep. 16, 2014 at http://www.oandp.com/articles/2004.11.01.asp, 8 pages.

"Volumental", retrieved on Sep. 16, 2014, at <<https://www.volumental.com/3D-scanning-solutions/>>, 2 pages.

"With a Mobile App, MTailor Offers Custom-Fit Tailored Shirts for Just $69", retrieved on Sep. 16, 2014 at <<http://techcrunch.com/2014/07/15/mtailor/>>, 5 pages.

* cited by examiner

FOOTWEAR RECOMMENDATIONS FROM FOOT SCAN DATA DESCRIBING FEET OF A USER

BACKGROUND

Many users seek to find comfortable shoes or shoes that fit in a medical or physiological context. In some instances, a user may visit multiple retailers and try on many shoes before finding a pair of shoes that satisfy the user's needs. In other instances, a user may make several purchases and returns through an online site to obtain a desired pair of shoes. These processes of purchasing shoes are often time consuming and create frustrated users who are unable to find shoes that fit properly and meet their needs. Further, these processes waste time and money.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
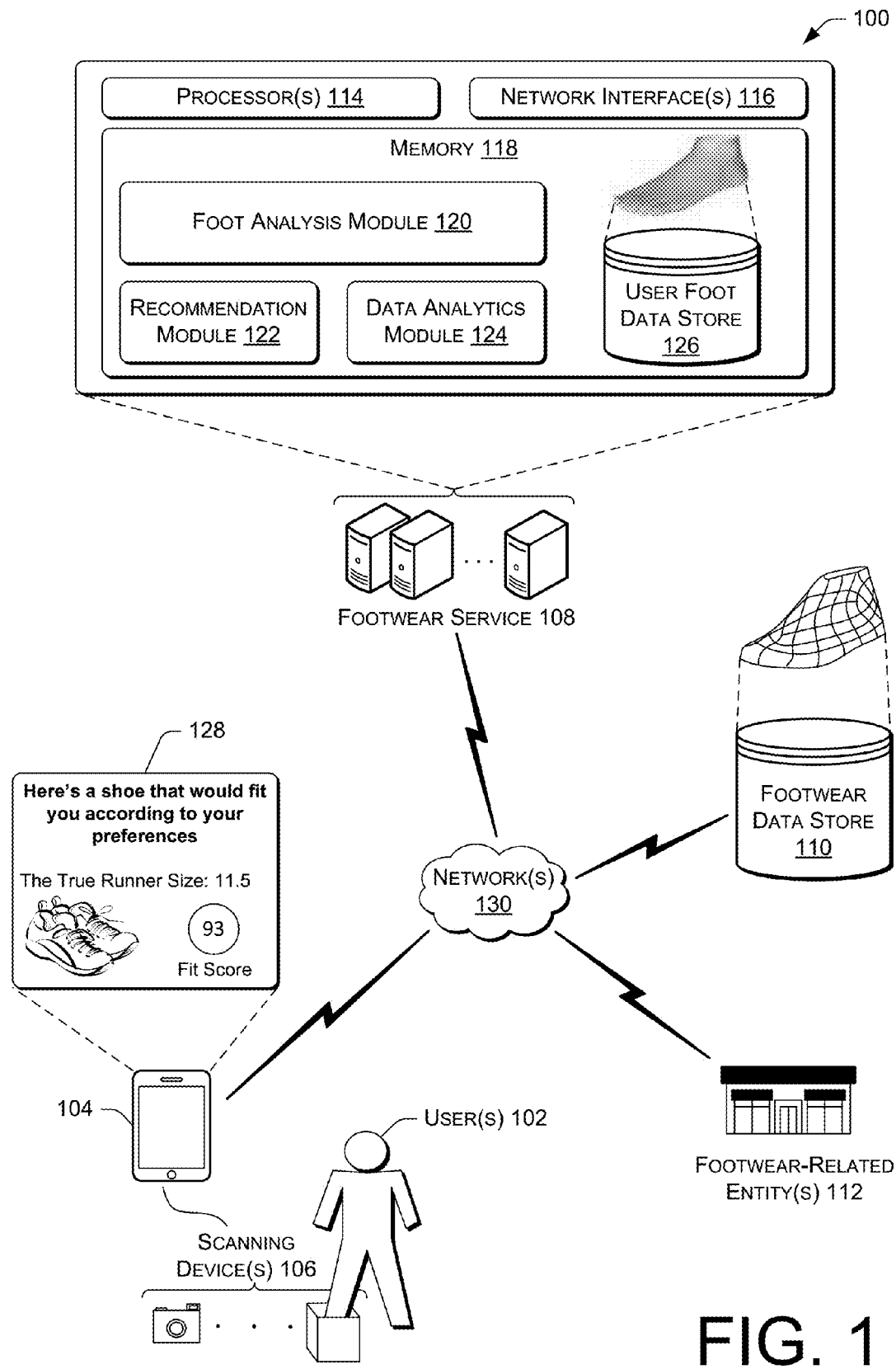
FIG. 1 illustrates an example architecture in which techniques described herein may be implemented.

This disclosure describes techniques for recommending footwear based on scan data describing feet of a user and a variety of other information. In some instances, a footwear service may obtain scan data describing feet or ankles of a user. The scan data may originate from a scanning device, such as a camera, depth sensor, three-dimensional (3D) scanner and so on, that is employed by the user or others. The footwear service may process the scan data to generate a 3D representation of the user's feet or ankles, such as a 3D model or other representation. The footwear service may also obtain other information about the user, such as user preferences (e.g., a preferred tightness of a footwear item, preferred type of toe box, preferred material and so on), the user's age, the user's height, the user's weight, estimated future growth (e.g., of the user's feet), orthotics data, information identifying an activity that the user participates in, place of origin, residence of user, ethnicity and so on.

The footwear service may utilize the 3D representation of the user's feet or ankles and the other information about the user to generate a recommendation for the user. In some instances, the recommendation identifies a footwear item that fits to the 3D representation of the user's feet or ankles and satisfies the other information about the user. To illustrate, the recommendation may suggest a new basketball shoe (and size) that fits to a desired tightness tolerance that is specified by the user. Alternatively, or additionally, the recommendation identifies characteristics about the user's feet or ankles to assist in identifying a footwear item. To illustrate, the recommendation may indicate that the user has a relatively high arch (e.g., in comparison to the general population) and would benefit from a footwear item that has support for the high arch.

The recommendation may be provided to any number of users. In one example, the recommendation may be made available to a user as the user browses an online shoe retailer site. This recommendation may indicate a level of fit of a shoe that the user is viewing (e.g., a fit score, a tiered classification—good fit, acceptable fit, bad fit, and so on). The recommendation may also suggest a type of shoe to acquire (e.g., a best fit shoe size, a style of shoe, etc.). In another example, the recommendation may be made available to a footwear-related entity, such as a designer of footwear, a manufacturer of footwear, a seller of footwear, an orthotics company and so on. Here, the recommendation may be used to design, manufacture or sell a footwear item. In yet further examples, the recommendation may provide a variety of other information.

Additionally, or alternatively, the footwear service may analyze data for a plurality of users that describes feet or ankles of the plurality of users. For example, the footwear service may analyze scan data and/or 3D representations of the feet or ankles. Based on the analysis, the footwear service may generate analytics data for a particular group of users (e.g., users that share a common characteristic, such as living in same city, having a same age/height/weight, being interested in similar activities and so on). To illustrate, the analytics data may indicate a type of feet or ankles of the particular group (e.g., a common foot size), a variation of feet or ankles of the particular group (e.g., a range of differences in feet sizes), a trend of feet or ankles of the particular group (e.g., users feet grow two sizes from ages 10 to 11), a characteristic of feet or ankles for the particular group and so on.

The analytics data may be provided to any number of users or entities, such as designers, manufacturers, distributors, retailers, sales representatives and so on. In one instance, the analytics data is provided to a distributor to assist in distributing footwear items to different geographical regions. In another instance, the analytics data is provided to a manufacturer to assist in determining the types of footwear items to be manufactured. In yet a further instance, the analytics data is provided to a designer to assist in designing new footwear items.

The techniques described herein may provide valuable information regarding footwear. For example, by providing a recommendation for a footwear item that is based on a 3D representation of a user's feet, and other information about the user, a personalized footwear item may be identified. Further, by providing analytics data regarding a plurality of users, footwear items may be designed, manufactured, distributed, sold, and so on, in a manner that more accurately reflects the needs of consumers.

This brief introduction is provided for the reader's convenience and is not intended to limit the scope of the claims. Furthermore, the techniques described in detail below may be implemented in a number of ways and in a number of contexts. Example implementations and contexts are provided with reference to the following figures, as described below in more detail. However, the following implementations and contexts are but some of many.

Example Architecture

FIG. 1 illustrates an example architecture 100 in which techniques described herein may be implemented. The architecture 100 includes one or more users 102 (hereinafter "the user 102") employing one or more computing devices 104 (hereinafter "the device 104"). The device 104 may include and/or be connected to one or more scanning devices 106 (hereinafter "the scanning device 106") that scans a foot (or feet) of the user 102. The scanning device 106 may be wirelessly connected or wired to the device 104 (e.g., the scanning device 106 may be communicatively coupled to the device 104 through a wire or wirelessly). The architecture 100 also includes a footwear service 108 to provide footwear recommendations, analytics data and perform a variety of other functions. For example, the footwear service 108 may receive scan data from the device 104 and footwear data about a footwear item from a footwear data store 110. Based on the scan data and footwear data, user preferences and a variety of other information, the footwear service 108 may generate a recommendation regarding footwear, which may be provided to the user 102 and/or one or more footwear-related entities 112 (hereinafter "the footwear-related entity 112").

The device 104 may comprise any type of computing device, such as a laptop computer, a desktop computer, a server, a smart phone, an electronic reader device, a mobile handset, a personal digital assistant (PDA), a portable navigation device, a portable gaming device, a tablet computer, a watch, a portable media player, a wearable computing device (e.g., a watch, an optical head-mounted display (OHMD), an implanted computing device or technology, contact lens with computing capabilities, etc.), a television, a set-top box, a computer system in a vehicle, an appliance, a camera, a robot, a hologram system, a security system, a thermostat, a smoke detector, an intercom, a home media system, a lighting system, a heating, ventilation and air conditioning (HVAC) system, a home automation system (e.g., system to control a security system, a thermostat, a smoke detector, an intercom, a home media system, a lighting system, an HVAC system, etc.), a projector, an automated teller machine (ATM), and so on. In some instances herein, the device 104 may be referred to as a mobile device, indicating that the device is portable.

As noted above, the device 104 may include and/or be communicatively coupled to the scanning device 106. In some instances, the scanning device 106 is integral with the device 104, while in other instances the scanning device 106 is wirelessly coupled or wired to the device 104 (e.g., the scanning device 106 may be external to the device 104). The scanning device 106 may include one or more cameras, depth sensors (e.g., infrared laser projector and sensor), pressure sensors, microphones, projectors, speakers and so on, that may capture data. For example, the scanning device 106 may comprise a 3D scanner, range camera, x-ray device, thermal imaging camera and so on. In one example, the scanning device 106 comprises a Kinect® sensor. In some instances, the scanning device 106 may contact an object to scan the object (e.g., probe the object with arms or other items). In other instances, the scanning device 106 may emit radiation or light and detect its reflection or radiation (e.g., triangulation, time-of-flight scanning, etc.).

In any event, the scan device 106 may scan an object to obtain scan data. The scan data may include an image(s) of the object, a video(s) of the object, depth information, a data point(s) (e.g., a point cloud, vector, matrix, etc.), pressure information and so on. In some instances, the scan data may be obtained from a bare foot of a user, while in other instances the scan data may be obtained from a foot that includes a clothing item or orthotic thereon, such as a foot wearing a sock or stocking. Alternatively, or additionally, the scan data may be of an inside and/or outside of an orthotic (e.g., brace, support, etc.). The scan data may be taken from multiple points-of-view of the object. The scan data may be provided to the footwear service 108 via the device 104 and processed at the footwear service 108. Although, in some instances the processing that is performed by the footwear service 108 may be performed locally at the device 104.

Although scan data, 3D representations and other information are discussed in many instances as describing a foot or feet of a user, the scan data, 3D representations and other information may additionally, or alternatively, describe an ankle or any other portion of a leg. Further, analytics data may similarly relate to an ankle or any other portion of a leg.

The footwear service 108 may include one or more computing devices, such as one or more desktop computers, laptop computers, servers and the like. The one or more computing devices may be configured in a cluster, data center, cloud computing environment, or a combination thereof. In one example, the one or more computing devices provide cloud computing resources, including computational resources, storage resources and the like, that operate remotely to the device 104.

The one or more computing devices of the footwear service 108 may include one or more processors 114, one or more network interfaces 116 and memory 118. The one or more processors 114, the one or more network interfaces 116 and/or the memory 118 may be communicatively coupled to each other. The one or more processors 114 may include a central processing unit (CPU), a graphics processing unit (GPU), a microprocessor, a digital signal processor (DSP) and so on.

The memory 118 may include software functionality configured as one or more "modules." The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc. As illustrated in FIG. 1, the memory 118 includes a foot analysis module 120, a recommendation module 122 and a data analytics module 124.

The foot analysis module 120 may analyze data to generate a 3D representation or mathematical comparison or manipulation of a foot (or feet). For instance, the foot analysis module 120 may receive scan data from the device 104 that describes a foot of the user 102. Based on the scan data, the foot analysis module 120 may generate a 3D representation of the foot of the user 102. For instance, the foot analysis module 120 may identify portions of an image or video that relate to a foot (instead of an area surrounding a foot), and use those portions to form the 3D representation. A 3D representation may be scaled to, or otherwise represent, a foot of a user. A 3D representation may comprise, for example, a 3D model (e.g., mesh, etc.), a mathematical representation (e.g., vectors, matrices, data points, etc.), a point cloud and so on. A 3D representation may comprise a solid or a shell (e.g., surfaces). In some instances, a 3D representation comprises processed scan data. Here, the scan data may be subjected to processing to smooth raw scan data and/or remove outlining data (e.g., noise). Data for 3D representations of feet may be stored in a user foot data store 126.

The recommendation module 122 may generate a recommendation regarding footwear. A recommendation may generally indicate how well one or more footwear items fit a foot (or feet) of a user. A recommendation may additionally, or alternatively, provide a variety of other information, as discussed in further detail below. The recommendation module 122 may calculate a fit of a footwear item based on a 3D representation of a foot and footwear data describing the footwear item. The footwear data may include a 3D representation of an internal/external portion of the footwear item and/or describe any other characteristic that is associated with the footwear item, such as a material of the footwear item, a manufacturer of the footwear item and so on. The footwear data may be obtained from the footwear data store 110, which stores footwear data for a plurality of footwear items. In some instances, the footwear data store 110 is associated with a manufacturer, designer or retailer of footwear items. A footwear item may include a shoe, a boot, a sandal, an orthotic, a slipper, a sock, a prosthetic or any other item that is worn on a foot.

To illustrate how the recommendation module 122 may calculate a fit of a footwear item, the recommendation module 122 may determine differences between any number of characteristics of a foot and a footwear item. For example, the recommendation module 122 may calculate a difference between a shoe length and a foot length (e.g., dimension along a main axis of a foot and a shoe), a difference between a shoe width and a foot width (e.g., an axis that is perpendicular to the main axis), a difference between a shoe width and a foot width at a widest point of the foot, a difference between a shoe height and a foot height at a particular position along the foot, a difference between a shoe heel shape and a foot heel shape, a difference between a shoe arch and a foot arch (e.g., difference in shape, height, etc.), a difference between a shoe instep and a foot instep, a difference between a shoe toe box and a foot toe box, a difference between a shoe shape and a foot shape, a difference between a shoe ankle and a foot ankle (e.g., size, shape, etc.) and so on. Each of the differences may be weighted based on user preferences or other information that is known about a user (e.g., the user prefers shoes that are within a relatively small width tolerance and relatively large arch tolerance).

In one example, the differences between the characteristics of the foot and the footwear item may be compared to different thresholds to determine a level of fit of the footwear item within a classification (e.g., the footwear item is a "good fit," an "acceptable fit," or a "poor fit"). The different thresholds may be set based on user preferences or other information that is known about the user (e.g., the user prefers relatively loose shoes). In another example, the differences between the characteristics of the foot and the footwear item may indicate a level of fit on a scale (e.g., the footwear item has a fit score of 93 out of 100, indicating that the footwear item is a relatively good fit). The level of fit of the footwear item may be provided in a recommendation. If, for instance, the user desires to view a ranking of a plurality of footwear items, the level of fit of the footwear item may be used to rank the plurality of footwear items. Any number of footwear items that rank toward a top of the ranking, or toward a bottom in some instances, may be provided in a recommendation.

In some instances, a recommendation may account for differences in feet of a user. To illustrate, if a user's right foot is larger than a left foot, then a recommendation may specify that the right foot should use a larger sized shoe than the left foot (e.g., "we recommend that you use a size 11 for your right foot and a size 10.5 for your left foot"). Additionally, or alternatively, if the user's feet are different in other ways (e.g., a left foot includes a larger toe than a corresponding toe on a right foot, the user's right ankle is shaped differently than the user's left ankle, etc.), then the recommendation may specify different types of shoes for the different feet of the user (e.g., recommend one brand of shoes for a right foot and another brand for a left foot, etc.).

Additionally, or alternatively, the recommendation module 122 may generate a recommendation for footwear based on a variety of other information related to a user. As such, a recommendation may be personalized for a user. Example information that may be used to generate a recommendation includes:

a user preference related to a preferred type of footwear item for a user—a preferred footwear tightness, a preferred footwear arch (e.g., flat, normal, overarched, etc.), a preferred footwear instep, a preferred footwear toe box (e.g., rounded, pointed, etc.), a preferred footwear heel, preferred footwear ankle support (e.g., high level of support (high-top), medium level of support, low level of support (e.g., running shoe, scandal, etc.) and so on), a preferred footwear shape, a preferred footwear width (e.g., the user prefers an extra quarter inch around in the toe region), a preferred footwear length (e.g., the user prefers shoes that contact the tips of the toes), a type of footwear material (e.g., synthetic material, plastic, foam, mesh, canvas, leather, rubber, etc.) (the type of material may be an internal or external portion of the footwear item), a preferred footwear flexibility (e.g., the user prefers relatively stiff shoes, the user prefers flexible shoes, etc.), a preferred footwear use (e.g., the user prefers running shoes, basketball shoes, steel toe shoes, high-heeled shoes, casual shoes, etc.), a preferred footwear manufacturer (e.g., the user likes shoes from Company XYZ) and so on;

an activity in which the user is interested (e.g., the user enjoys running, hiking, riding a bike, walking, working in the garage, etc.)—in some instances an activity may be identified by monitoring data of a sensor (e.g., an accelerometer, heart rate monitor, gyroscope, and so on), of a smart phone or other wearable or implantable technology, in other instances an activity may be specified by a user or otherwise identified;

a foot condition of a user (e.g., a medical diagnosis—bunion, broken toe that has remained swollen for years, athletes foot, etc.);

estimated future growth (e.g., how much a user's feet are estimated to grow over the next year, how tall the user is estimated to grow over the next year and so on)—in some instances the estimated future growth may be based on previous growth of the user (e.g., the user's foot grew less than an inch last year, so the user will likely grow more this year due to the user's age), while in other instances the estimated future growth may be based on information about the general population (e.g., generally kids grow 1.5 inches from age 8 to age 9);

historical data describing a user's foot (e.g., a change in a 3D representation of the user's foot over the years);

user behaviors (e.g., a user drags a right foot while walking, resulting in an increased wear of the right heel portion of a shoe);

orthotics data (e.g., scan data from the inside of a user's brace, a type of orthotic that is used, etc.);

prosthetic data (e.g., a type of prosthetic that is used, scan data of a prosthetic, etc.);

clothing that is worn by a user (e.g., the user wears relatively thick socks, the user typically wears pants, the user often wears dresses, etc.);

a geographical location of a user (e.g., whether the user lives in a dry climate or a wet climate, a location of residence, etc.);

a place of origin of a user;

an ethnicity of a user;

a height of a user;

a weight of a user;

an age of a user;

a gender of a user; or any other information.

In some instances, a recommendation may provide information about customizing a footwear item for a user. For example, if a user is seeking a customized orthotic or prosthetic, the 3D representation of the user's foot, along with any other information about the user (including preferences), may be provided to an orthotic or prosthetic designer/manufacturer. This may assist users that include medical conditions to find footwear that suits their needs. In another example, a user may desire a customized pair of shoes, and the 3D representation, again along with any other information about the user (including preferences), may be provided to a shoe designer/manufacturer. In one illustration, a shoe may be printed via a 3D printer or other additive manufacturing methods.

The recommendation module 122 may make a recommendation available to the user 102, the footwear-related entity 112 and/or any other entity. In some instances, a recommendation is made available through an interface, such as those illustrated in FIGS. 4 and 5, while in other instances a recommendation may be sent in a notification to a user. A notification may include a text message, email, instant message and so on. In yet further instances, a recommendation may be provided as a targeted advertisement (e.g., providing a personalized shoe recommendation for a user in an advertisement on a web page upon identifying the user).

In the example of FIG. 1, a recommendation is provided to the user 102 via an interface 128. Here, the recommendation provides a fit score for a shoe that the user 102 is viewing (i.e., 93). The recommendation also indicates a shoe size that would fit the user best (i.e., 11.5). As noted above, and although not illustrated in FIG. 1, the recommendation may provide different shoe sizes for different feet (e.g., recommend one size for a right foot and a different size for a left foot). Other types of recommendations are discussed below.

The footwear-related entity 112 may include a designer of footwear, a manufacturer of footwear, a distributor of footwear, a retailer of footwear, a sales representative of footwear and so on. In some instances, the footwear-related entity 112 may be associated with footwear implants, orthotics, medical devices, assistive devices, medical entities and so on.

The data analytics module 124 may provide analytics data about feet of users. The data analytics module 124 may collect data about users' feet over time. The data may be collected with the explicit authorization of the users and/or in an anonymous manner that removes information identifying the users. The data may include scan data, 3D representations of feet, user preferences regarding footwear or any other information. The data analytics module 124 may analyze the data to generate analytics data for a group of users. The group of users may share a common characteristic, such as living in a same city, having a same age/height/weight, being interested in similar activities and so on. Example analytics data indicates:

a type of feet of a particular group (e.g., a foot size that is common for a particular number of users, an arch type that is common for a particular number of users, etc.);

a variation of feet of a particular group (e.g., a range of feet sizes for a particular population of users, etc.);

a trend of feet of a particular group (e.g., users' feet of a particular age group grow two sizes from ages 10 to 11);

a characteristic of feet for a particular group (e.g., users in the south have larger toes, etc.); or any other information.

The analytics data may be provided to the user 102, the footwear-related entity 112 or any other entity. In one instance, the analytics data is provided to a distributor to assist in distributing footwear items to different geographical regions. In another instance, the analytics data is provided to a designer to assist in designing new footwear items. In yet another instance, the analytics data is provided to a manufacturer to assist in determining the types of footwear items to be manufactured. The analytics data may assist an entity in evaluating a particular market, determining manufacturing or distribution plans and in performing a variety of other tasks.

Although in the example architecture 100 of FIG. 1, the modules 120-124 are illustrated as being included in the footwear service 108, one or more of the modules 120-124 may be included in the device 104 or elsewhere. As such, in some instances the footwear service 108 may be eliminated entirely (e.g., when processing is performed locally on a device). Further, in some instances some processing of the modules 120-124 may be performed locally at the device 104 and data from the processing may be sent to the footwear service 108 for additional processing, storage, etc. Further, although the footwear data store 110 is illustrated as being separate from the footwear service 108, in some instances the footwear data store 110 may be included in the footwear service 108 and/or located at the footwear-related entity 112.

The architecture 100 may also include one or more networks 130 to enable the device 104, the footwear service 108, the footwear data store 110 and/or the footwear-related entity 112 to communicate with each other. The one or more networks 130 may include any one or combination of multiple different types of networks, such as cellular networks, wireless networks, Local Area Networks (LANs), Wide Area Networks (WANs) and the Internet.

Example Device

Figure 2:
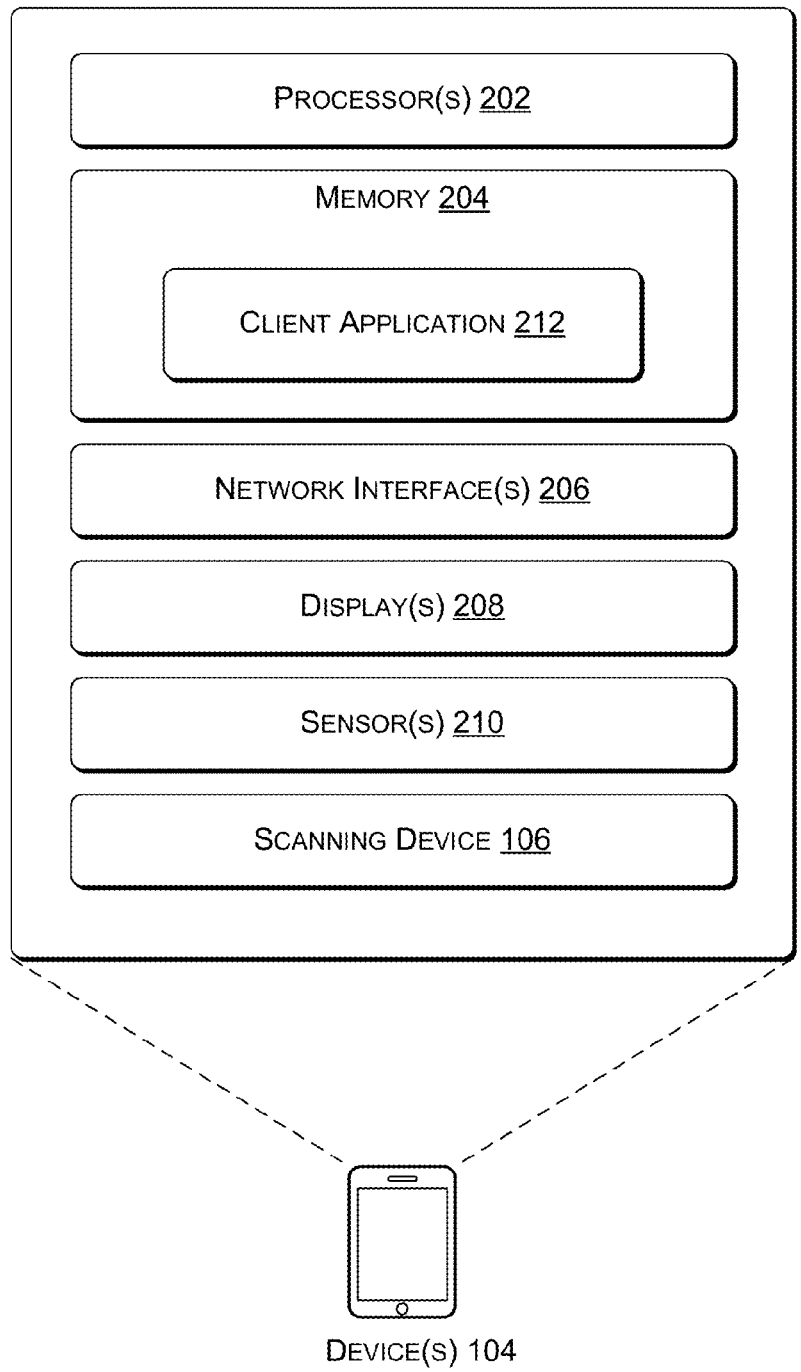
FIG. 2 illustrates example details of an example device.

FIG. 2 illustrates example details of the device 104 of FIG. 1. The device 104 may be equipped with one or more processors 202, memory 204, one or more network interfaces 206, one or more displays 208, one or more sensors 210 and the scanning device 106. Each of the components 204-210 and 106 may be communicatively coupled to the one or more processors 202 and/or to each other. The one or more processors 202 may include a central processing unit (CPU), a graphics processing unit (GPU), a microprocessor, a digital signal processor and so on. The one or more displays 208 may include a touch screen, a Liquid-crystal Display (LCD), a Light-emitting Diode (LED) display, an organic LED display, a plasma display, an electronic paper display or any other type of technology. The one or more sensors 210 may include an accelerometer, a compass, a gyroscope, a magnetometer, a Global Positioning System (GPS), an olfactory sensor (e.g., for smell), a pressure sensor, a microphone or other sensor. The one or more sensors 210 may be implemented with the scanning device 106 in some instances.

The memory 118 of the footwear service and/or the memory 204 of the device 104 (as well as all other memory described herein) may include one or a combination of computer storage media (e.g., computer-readable storage media). Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, solid-state memory (e.g., solid-state drive (SSD)), or any other non-transmission medium that can be used to store information for access by a computing device. As defined herein, computer storage media does not include communication media, such as modulated data signals and carrier waves. As such, computer storage media comprises non-transitory media.

As illustrated, the memory 204 includes a client application 212 to perform processing. The client application 212 may generally operate in cooperation with the footwear service 108 to facilitate footwear recommendations, data analytics and a variety of other functions. For example, the client application 212 may provide an interface to allow a user to scan a foot and/or provide user preferences regarding preferred footwear items or other information about the user. The scan data and user preferences may be sent to the footwear service 108 for processing. Thereafter, the client application 212 may receive a recommendation from the footwear service 108 regarding a footwear item that satisfies the foot of the user and the user preferences. The recommendation may be displayed to the user through the one or more displays 208. In another example, the client application 212 may receive analytics data regarding feet for a plurality of users and cause the analytics data to be displayed. As noted above, the device 104 may, in some instances, perform any processing that is performed by the footwear service 108 (e.g., the client application 212 may perform any of the functions of the modules 120-124).

Example Interfaces

Figure 3:
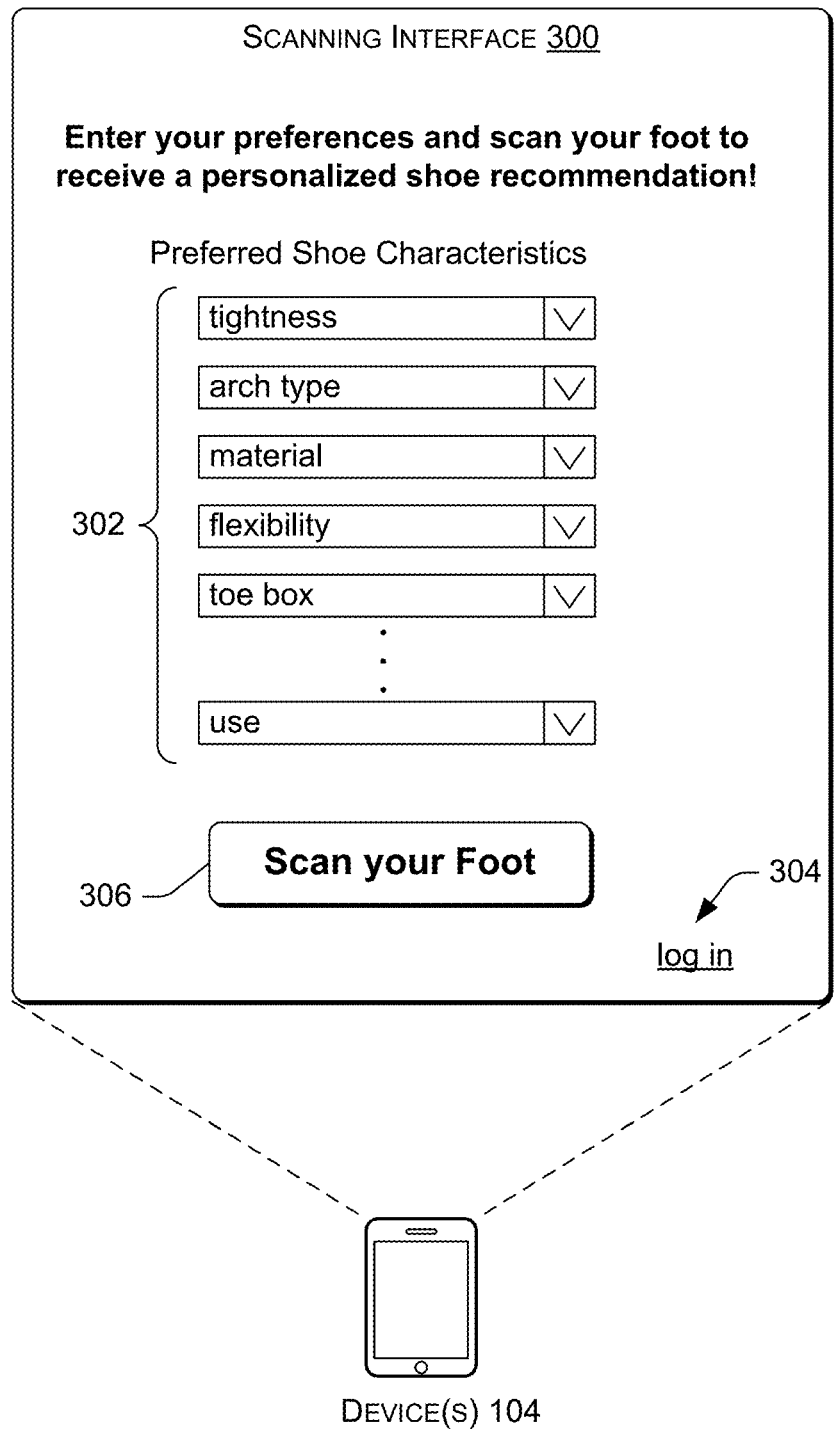
FIG. 3 illustrates an example scanning interface to enable a user to scan a foot and provide user preferences regarding footwear.
Figure 4:
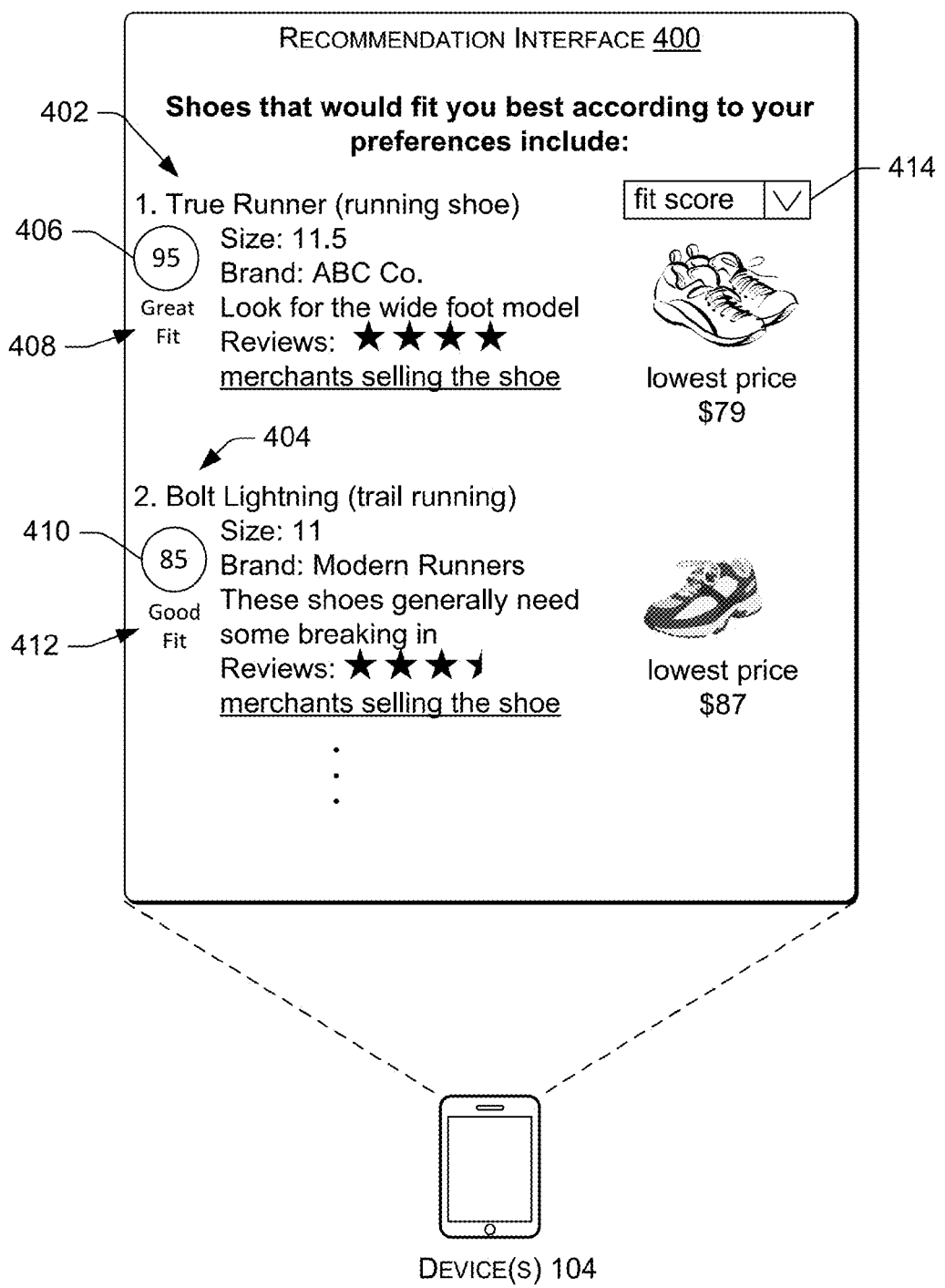
FIG. 4 illustrates an example recommendation interface that presents recommendations regarding footwear items.
Figure 5:
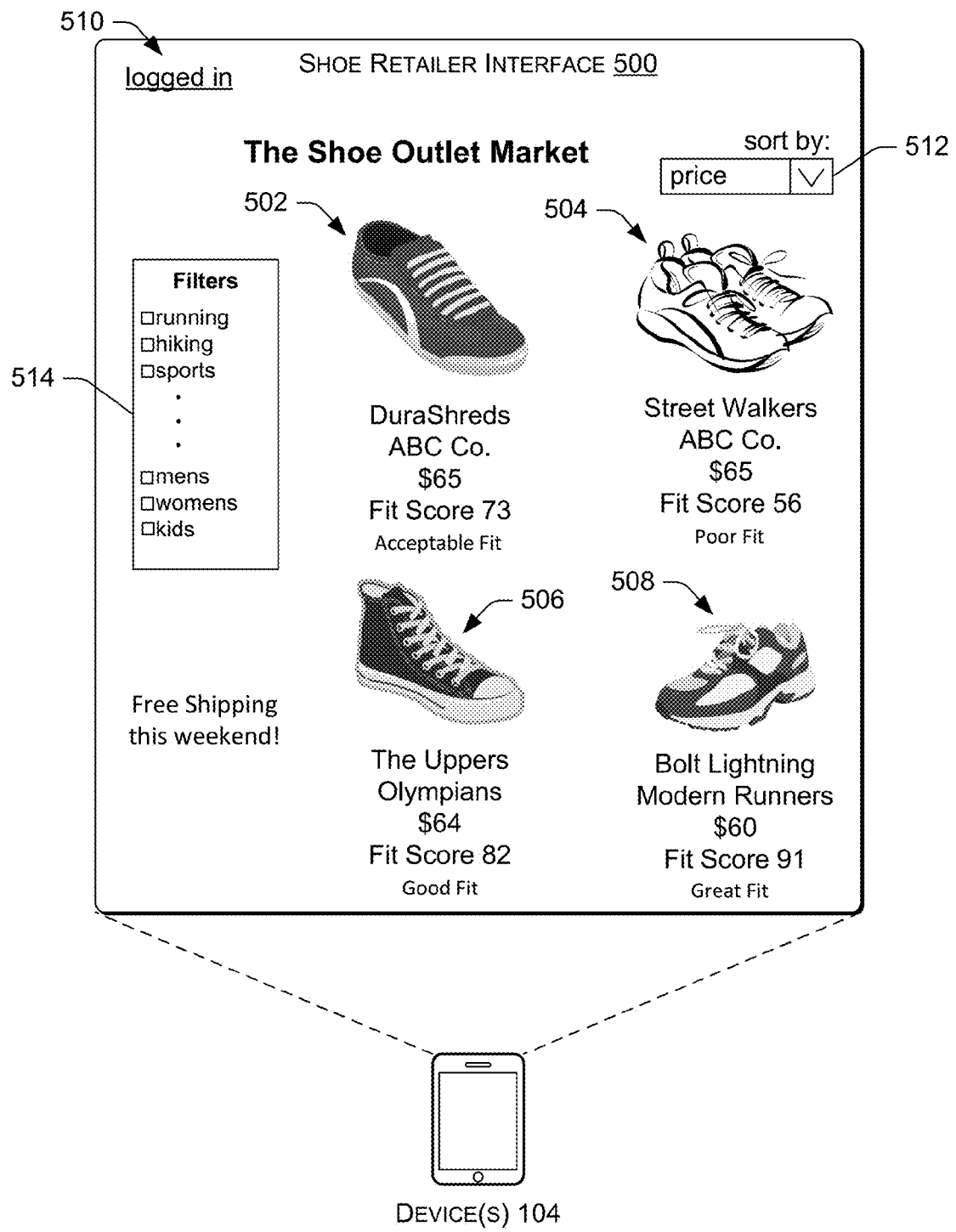
FIG. 5 illustrates an example shoe retailer interface that presents footwear items that are being offered for acquisition along with recommendation information.

FIGS. 3-5 illustrate example interfaces that may be presented to facilitate techniques discussed herein. The interfaces may be displayed via a browser, an application and so forth. In some instances, an application is implemented as a client application, such as a mobile application, desktop-based application, etc. In other instances, the application is implemented as part of a platform (e.g., a mobile platform), or within another context.

FIG. 3 illustrates an example scanning interface 300 to enable a user to scan a foot and provide user preferences regarding footwear. The scanning interface 300 may be presented when a user desires to upload the user's foot scan and/or preferences to obtain a personalized recommendation. The personalized recommendation may be provided in response to uploading the information and/or at another time. Although not illustrated in FIG. 3, the scanning interface 300 may enable a user to provide any information about the user that may be beneficial in creating a recommendation, such as a user's age, height, weight, location, current shoe size and so on.

As illustrated in FIG. 3, the scanning interface 300 includes drop down menus 302 to specify one or more user preferences regarding a desired characteristics of a footwear item. For example, the user may specify a desired tightness for a footwear item, a desired arch type for a footwear item (e.g., flat, normal, overarched, etc.), a desired material that a footwear item is made of (e.g., external and/or internal material), a desired flexibility of a footwear item (e.g., stiff, flexible, etc.), a desired toe box of a footwear item (e.g., rounded, pointed, etc.), a desired use of a footwear item (e.g., an activity that a shoe will be used for, such as hiking, running, walking, etc.), a desired instep of a footwear item, a desired heel of a footwear item, a desired ankle of a footwear item, a desired shape of a footwear item, a desired width/length of a footwear item, a desired manufacturer of a footwear item or any other information (such as other user preferences described herein).

In some instances, a user may provide different user preferences for different footwear categories. That is, the user may specify one set of preferred footwear characteristics for one type of footwear category and another set of preferred footwear characteristics for another footwear category. To illustrate, the user may specify that he prefers his running shoes to be relatively tight and made of a breathable material, and may specify that he prefers his casual shoes to be relatively loose and made of a waterproof material. The user may login via a link 304 to save user preferences to a user account.

The scanning interface 300 also includes a button 306 to enable a user to scan a foot (or feet). In response to selecting the button 306, the scanning device 106 may begin capturing data of a foot of the user. In one example, the user moves the scanning device 106 around the foot to capture multiple images of the user's foot or obtain other information. Upon completing the scan, scan data of the user's foot and/or the user preferences may be sent to the footwear service 108 for processing and/or storage. Alternatively, or additionally, the user may upload, to the footwear service 108, an existing image, video, pressure information, measurement and so on regarding the user's foot.

FIG. 4 illustrates an example recommendation interface 400 that presents recommendations regarding footwear items. The recommendation interface 400 may be presented in a variety of instances, such as in response to a user requesting a recommendation, in response to a user providing scan data, in response to the user visiting an online retailer site and so on. In this example, the user has provided scan data of a foot and user preferences through the scanning interface 300 of FIG. 3. In particular, the user has requested a running shoe by any manufacturer that is relatively wide in the toe region. The user has also specified a geographical location where the user resides and provided a medical condition associated with the user's feet, namely that the user has a bunion. In response to the request, recommendations 402 and 404 have been identified as fitting the user's foot and satisfying the user preferences.

Each of the recommendations 402 and 404 includes information about a recommended shoe. The recommendation 402 for the "True Runner" shoe indicates that the user should try a size 11.5 shoe in the wide foot model. The recommendation 402 provides a fit score 406 for the shoe (i.e., 95 on a scale of 100) and a fit classification 408 for the shoe (i.e., "great fit"). In this example, the fit classification 408 may include one of five levels—"excellent fit," "great fit," "good fit," "acceptable fit," and "poor fit." The recommendation 402 also includes information about reviews from customers, a link to visit sites that are selling the shoe and pricing information (i.e., a lowest price found for the shoe). Meanwhile, the recommendation 404 for the "Bolt Lightning" shoe indicates that the user should try a size 11 and that this shoe generally requires some breaking in. The recommendation 404 provides a fit score 410 for the shoe (i.e., 85 on a scale of 100) and a fit classification 412 for the shoe (i.e., "good fit"). The recommendation 404 also includes information about reviews from customers, a link to merchant sites and pricing information. Although not illustrated, the recommendations 402 and/or 404 may include links to shoes that are deemed to be similar according to style, brand, category, price and so on.

In this example, the user has requested to rank the shoes according to the fit scores 406 and 410. However, the user may utilize a drop down menu 414 to rank the shoes according to any other criteria. In one instance, the shoes may be ranked according to a level of fit of the shoes for an estimated future growth of the user's feet. Here, historical data for the user's feet may be analyzed. The historical data may include 3D representations for the user's feet over time (e.g., a first 3D representation, a second 3D representation a year later, a third 3D representation two years later and so on). Average growth information for users that are deemed to be similar to the user may also be analyzed (e.g., growth information for users that are the same age). The analysis may estimate what the user's feet will be like at a particular future time (e.g., next year, in two years, etc.). Based on the estimated future growth, the recommendation interface 400 may rank shoes according to an estimated fit of the shoes at a future time (e.g., in two years). This may be useful to find, for example, children's shoes that may fit as a child grows.

FIG. 5 illustrates an example shoe retailer interface 500 that presents footwear items that are being offered for acquisition along with recommendation information. An acquisition may be achieved through purchasing, renting, borrowing, trading, bartering or otherwise acquiring. In this example, the shoe retailer interface 500 is provided as a user browses for a shoe to purchase.

As illustrated, the shoe retailer interface 500 presents shoes 502-508 that are being offered for acquisition. Here, the user has logged in to the shoe retailer interface 500, as illustrated by an indicator 510. By logging in, the associated retailer site may retrieve 3D representations of the user's feet, user preferences or other information about the user to provide a personalized shopping experience. For example, the shoe retailer interface 500 may provide a fit score and/or a fit classification for each of the shoes 502-508, which may generally indicate a level of fit of the shoes 502-508 for the user. By doing so, the user may identify shoes that satisfy the user's needs. Further, since customers may identify shoes that fit and satisfy their needs, shipping fees due to returned shoes that do not satisfy the customer's needs may be reduced. As such, the features of the shoe retailer interface 500 may provide value to consumers and retailers (e.g., online retailers).

The shoe retailer interface 500 also includes a drop down menu 512 to order shoes that are presented and filters 514 to filter through the shoes.

Example Processes

Figure 6:
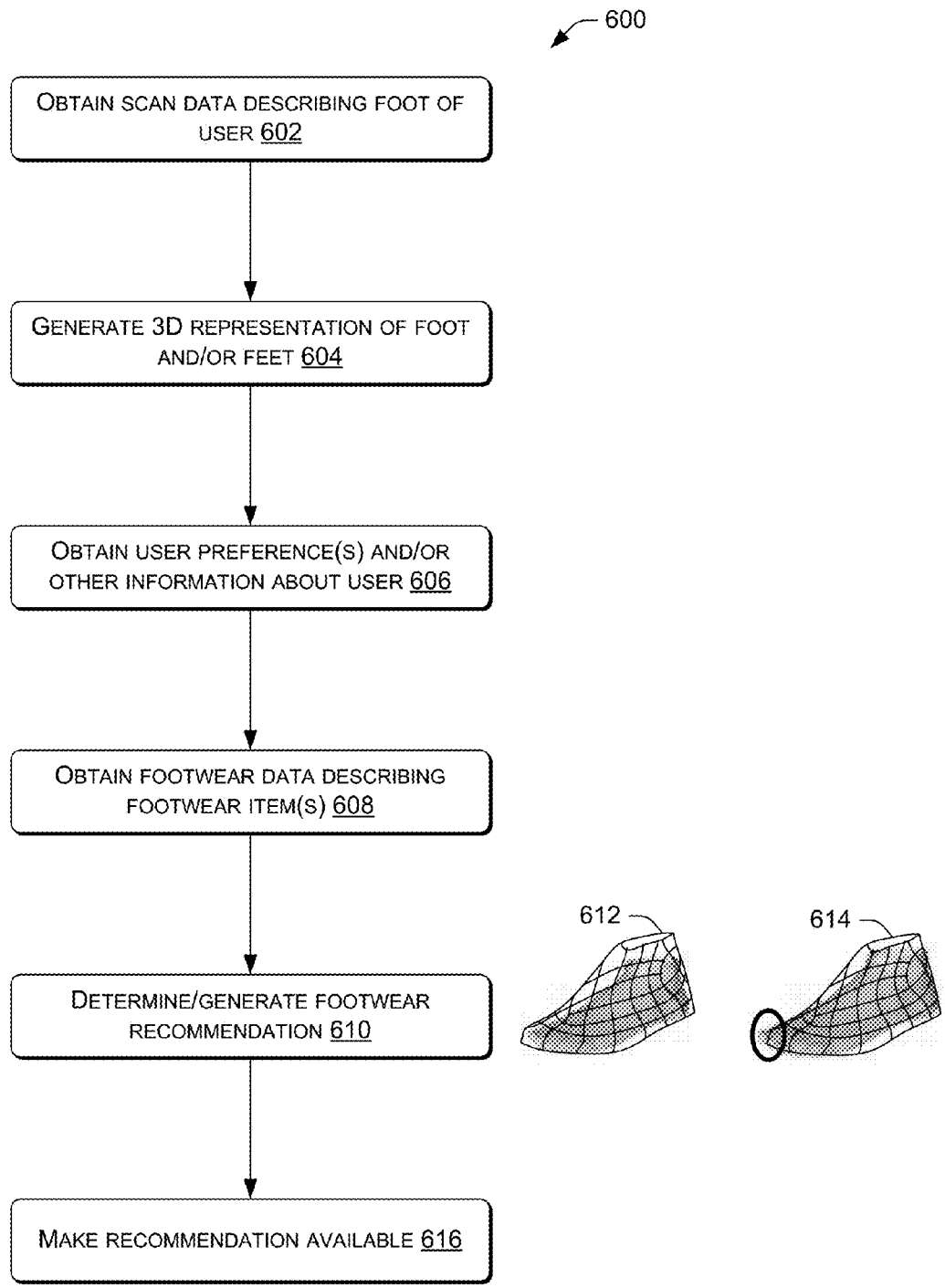
FIG. 6 illustrates an example process to provide a footwear recommendation based on foot scan data.
Figure 7:
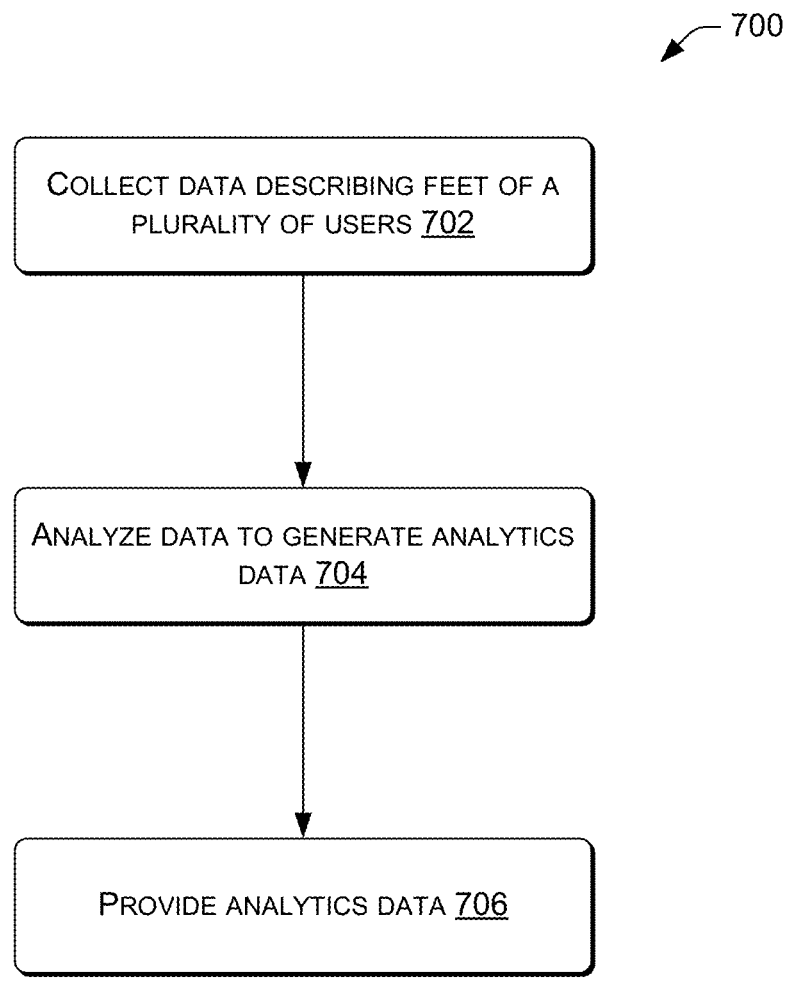
FIG. 7 illustrates an example process to analyze data regarding feet for a plurality of users and provide information from the analysis.
Figure 8:
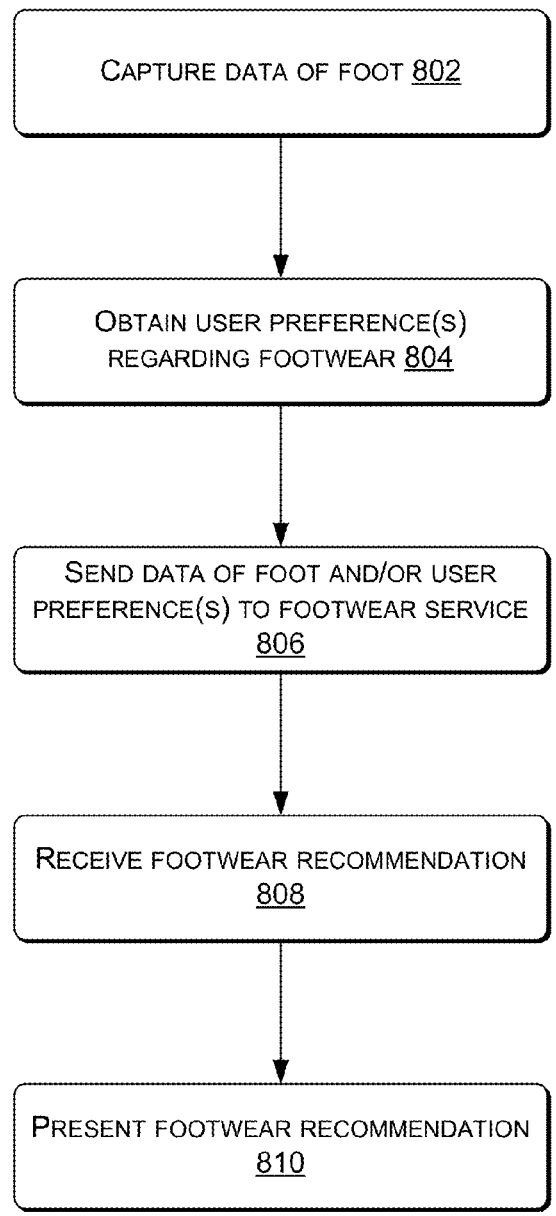
FIG. 8 illustrates an example process to receive a footwear recommendation from a footwear service.

FIGS. 6-8 illustrate an example process 600, 700 and 800 for employing the techniques described herein. For ease of illustration the processes 600, 700 and 800 are described as being performed in the architecture 100 of FIG. 1. For example, one or more of the individual operations of the processes 600 and 700 may be performed by the footwear service 108, while the process 800 may be performed by the device 104. However, the processes 600, 700 and 800 may be performed in other architectures. Moreover, the architecture 100 may be used to perform other processes.

The processes 600, 700 and 800 (as well as each process described herein) are illustrated as a logical flow graph, each operation of which represents a sequence of operations that can be implemented in hardware, software or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Further, any number of the individual operations may be omitted.

FIG. 6 illustrates the example process 600 to provide a footwear recommendation based on foot scan data.

At 602, the footwear service 108 may obtain scan data describing a foot and/or feet of a user. The scan data may include an image(s) of the foot, a video(s) of the foot, depth information of the foot, pressure information of the foot on a surface (e.g., based on body weight distribution and/or foot physiology), a data point(s) of the foot (e.g., a point cloud, vector, matrix, measurement, etc.) and so on. In some instances, the user may upload the scan data through a website, a client-side application or portal. In other instances the scanning device 106 may capture the scan data and provide the scan data to the footwear service 108.

At 604, the footwear service 108 may generate a 3D representation of the foot and/or feet of the user. The 3D representation may be generated based on the scan data. The 3D representation may include a 3D model, mathematical model/vector/matrix, a point cloud and so on of the foot or feet of the user. The operation 604 may include (i) using a standard 3D foot representation (e.g., template) and adjusting dimensions of the standard 3D foot representation to match the user's foot, (ii) creating a 3D representation of the user's foot without reference to a standard 3D foot representation, (iii) processing the scan data of the user's foot to remove outlining data (e.g., noise) and so on.

At 606, the footwear service 108 may obtain one or more user preferences for the user and/or other information about the user. The one or more user preferences may relate to footwear tightness, a footwear arch, a footwear instep, a footwear toe box, a footwear heel, footwear ankle support, a footwear shape, a footwear width, a footwear length, a type of footwear material, footwear flexibility, a footwear use, a footwear style and so on. The other information about the user may indicate a height of the user, a weight of the user, an age of the user, a gender of the user, a location of residence of the user, a place of origin of the user, an ethnicity of the user, an activity in which the user is interested, a medical diagnosis for the user, estimated future growth of the user, orthotics data and so on.

At 608, the footwear service 108 may obtain footwear data describing one or more footwear items. The footwear data may be obtained from, for example, the footwear data store 110. The footwear data may describe an internal portion of a footwear item, a material of a footwear item, an external portion of a footwear item or any other characteristic of a footwear item. In some instances, the footwear data includes a 3D representation of a footwear item (internal or external portion).

At 610, the footwear service 108 may determine or generate a footwear recommendation for the user. The recommendation may be based on the 3D representation of the user's foot or feet, user preferences for the user or other information about the user, footwear data for footwear items and so on. In some instances, the recommendation may account for historical data about the user's foot or feet over time (e.g., previous 3D representations of the user's feet). The recommendation may generally indicate a level of fit of a footwear item and/or how well the footwear item satisfies the user's preferences and other information. To illustrate, a level of fit of a footwear item associated with a 3D representation 612, may be relatively good for the user's foot, since the 3D representation of the user's foot fits within the 3D representation 612 of the footwear item according to particular tolerances. In contrast, a level of fit of another footwear item associated with a 3D representation 614, may be relatively poor for the user's foot, since the 3D representation of the user's foot is larger than the 3D representation 614 of the footwear item.

The recommendation determined at operation 610 may be based on a tightness of a footwear item, an arch of a footwear item, an instep of a footwear item, a toe box of a footwear item, a heel of a footwear item, ankle support of a footwear item, a shape of a footwear item, a length a footwear item, a width of the footwear item, a material of a footwear item, a flexibility of a footwear item, an intended use of a footwear item, a style of a footwear item and so on.

At 616, the footwear service 108 may make the recommendation available. For example, the recommendation may be made available via an interface, such as those illustrated in FIGS. 4 and 5. In another example, the recommendation may be sent in a notification, such as an email, text message, instant message and so on. The recommendation may be sent to a device associated with the user, a footwear-related entity (e.g., an orthotics entity, a footwear designer/retailer/manufacturer/distributor, etc.). In one illustration, a footwear recommendation may be provided to an orthotics designer to help design an orthotic for the user. The recommendation may include a suggestion for designing a footwear item to help brace, control and/or correct a condition of the user's feet.

FIG. 7 illustrates the example process 700 to analyze data regarding feet for a plurality of users and provide information from the analysis.

At 702, the footwear service 108 may collect data describing feet of a plurality of users. The data may include collecting scan data describing feet of a plurality of users, 3D representations of the feet, user preferences regarding footwear or any other information for the plurality of users.

At 704, the footwear service 108 may analyze the data collected at operation 702 to generate analytics data. The analytics data may be for a particular group of users, such as users that share a common characteristic, such as living in a same city, having a same age/height/weight, having similar preferences, being interested in similar activities and so on. The analytics data may indicate one or more types of feet, a variation of feet, a trend of feet or a characteristic of feet for the particular group of users. In some instances, the analytics data identifies a characteristic that is common among the group of users, such as a common shoe size, common arch type, etc.

At 706, the footwear service 108 may provide the analytics data to a designer of footwear, a manufacturer of footwear, a distributor of footwear, a retailer of footwear, a sales representative of footwear, a medical entity, a designer of orthotics, a manufacturer of orthotics, a distributor of orthotics, a retailer of orthotics, a sales representative of orthotics or any other user or entity. For example, the analytics data may be provided to the footwear-related entity 112 and/or the user 102.

FIG. 8 illustrates the example process 800 to receive a footwear recommendation from a footwear service.

At 802, the device 104 may capture data of a foot or feet of a user. The data may include an image, a video, depth information, pressure information, measurements and so on. The data may be captured with the scanning device 106.

At 804, the device 104 may obtain one or more user preferences and/or other information from the user. The user preferences and/or other information may relate to preferred characteristics of a footwear item and/or any other information that may be useful in determining a footwear recommendation.

At 806, the device 104 may send the data of the foot or feet of the user obtained at 802 and the user preferences or other information obtained at 804 to the footwear service 108. The service provider 108 may generate a footwear recommendation regarding a footwear item that satisfies the foot of the user, the one or more user preferences and/or other information.

At 808, the device 104 may receive the footwear recommendation from the footwear service 108. At 810, the device 104 may present the footwear recommendation to the user, such as via a display of the device 104.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
   obtaining, in a processor, scan data describing feet of a user in three dimensions;
   generating, via the processor, a three-dimensional (3D) representation of the feet based at least in part on the scan data;
   obtaining, in the processor, one or more user preferences for the user regarding footwear;
   accessing, via the processor, a database storing footwear data for a plurality of footwear items from different manufacturers, the footwear data specifying physical dimensions of the respective footwear item including an internal main axis footwear item length and an internal widest-point footwear item width;

determining, via the processor, a fit score for each of the plurality of footwear items by
- (i) determining a difference between the internal main axis footwear item length and a foot length indicated by the 3D representation of the feet,
- (ii) determining a difference between the internal widest-point footwear item width and a foot width at a widest-point indicated by the 3D representation of the feet,
- (iii) determining a first weight for the difference of (i) based on the one or more user preferences,
- (iv) determining a second weight for the difference of (ii) based on the one or more user preferences, and
- (v) combining the first weight applied to the difference of (i) with the second weight applied to the difference of (ii);

determining, via the processor, which of the plurality of footwear items has a greatest fit score;

determining, via the processor, a recommendation for the user based on the footwear item that has the greatest fit score, the recommendation identifying at least one footwear item; and sending, via the processor, the recommendation to a device.

2. The method of claim 1, wherein the scan data includes at least one of:
one or more images of the feet of the user;
one or more videos of the feet of the user;
depth information of the feet of the user;
pressure information of the feet of the user; or
one or more data points of the feet of the user.

3. The method of claim 1, wherein the recommendation for the user is further based at least in part on historical data that describes the feet of the user over time.

4. The method of claim 1, wherein the recommendation for the user is further based on at least one of:
a height of the user;
a weight of the user;
an age of the user;
a gender of the user;
one or more activities in which the user is interested;
a medical diagnosis for the user;
estimated future growth of the user;
an ethnicity of the user; a place of origin of the user;
a location of residence of the user; or
orthotics data.

5. The method of claim 1, wherein the 3D representation of the feet includes at least one of:
a 3D model for each foot of the user;
a mathematical model, vector or matrix for each foot of the user; or
a point cloud for each foot of the user.

6. The method of claim 1, wherein the device is associated with at least one of:
the user;
an orthotics entity;
a medical entity;
a footwear designer;
a footwear manufacturer;
a footwear sales representative;
a footwear distributor; or
a footwear retailer.

7. The method of claim 1, wherein the determining the recommendation comprises:
ranking the plurality of footwear items based at least in part on the respective fit scores; and
determining the recommendation based at least in part on the ranking.

8. The method of claim 7, wherein the recommendation includes at least one of (i) the footwear items that are included within a top of the ranking, and (ii) the footwear items with fit scores that are similar to the greatest fit score.

9. The method of claim 1, wherein the one or more user preferences relate to at least one of a footwear tightness, a footwear arch, a footwear instep, a footwear toe box, a footwear heel, footwear ankle support, a footwear shape, a footwear width, a footwear length, a type of footwear material, a footwear flexibility, a footwear use or a footwear style.

10. The method of claim 1, wherein the recommendation is based on at least one of a foot condition or medical condition of the user, the recommendation describing a customized footwear item for the user.

11. The method of claim 1, further comprising:
collecting scan data describing feet of a plurality of users;
analyzing the scan data of the plurality of users to generate analytics data for a particular group of users, the analytics data indicating at least one of one or more types of feet, a variation of feet, a trend of feet or a characteristic of feet for the particular group of users; and
providing the analytics data to at least one of a designer of footwear, a manufacturer of footwear, a distributor of footwear, a retailer of footwear or a sales representative of footwear.

12. One or more non-transitory computer-readable media storing executable instructions that, when executed, instruct one or more processors to perform operations comprising:
generating a three-dimensional (3D) representation describing feet of a user in three dimensions;
accessing a database storing footwear data for a plurality of footwear items from different manufacturers, the footwear data specifying physical dimensions of the respective footwear item including an internal first dimension and an internal second dimension;
identifying one or more user preferences for the user regarding footwear;
determining a fit score for each of the plurality of footwear items by
- (i) determining a difference between the internal first dimension and a corresponding dimension provided by the 3D representation of the feet of the user,
- (ii) determining a difference between the internal second dimension and a corresponding dimension provided by the 3D representation of the feet of the user,
- (iii) determining a first weight for the difference of (i) based on the one or more user preferences,
- (iv) determining a second weight for the difference of (ii) based the one or more user preferences, and
- (v) combining the first weight applied to the difference of (i) with the second weight applied to the difference of (ii);

determining which of the plurality of footwear items has a fit score that exceeds a predetermined threshold;
generating a recommendation based on the determined footwear items that have fit scores exceeding the predetermined threshold; and
making the recommendation available via at least one of an interface or a notification.

13. The one or more non-transitory computer-readable media of claim 12, wherein the recommendation describes a level of fit of the footwear item.

14. The one or more non-transitory computer-readable media of claim 12, wherein the fit score is further based on at least one of:
a tightness of the footwear item;
an arch of the footwear item;
an instep of the footwear item;
a toe box of the footwear item;
a heel of the footwear item;
an ankle support of the footwear item;
a shape of the footwear item;
a length the footwear item;
a width of the footwear item;
a material of the footwear item;
a flexibility of the footwear item;
an intended use of the footwear item; or
a style of the footwear item.

15. The one or more non-transitory computer-readable media of claim 12, wherein the recommendation is made available via a footwear acquisition interface that offers for acquisition a plurality of footwear items, the plurality of footwear items including the footwear item.

16. The one or more non-transitory computer-readable media of claim 12, wherein the operations further comprise:
tracking data of a foot or ankle of the user, the data describing an injury;
or using scan data of the user to create or recommend a customized item.

17. The one or more non-transitory computer-readable media of claim 12, wherein the operations further comprise:
collecting scan data describing feet of a plurality of users;
analyzing the scan data of the plurality of users to generate analytics data for a particular group of users, the analytics data indicating at least one of one or more types of feet, a variation of feet, a trend of feet or a characteristic of feet for the particular group of users; and
providing the analytics data to at least one of a designer of footwear, a manufacturer of footwear, a distributor of footwear, a retailer of footwear, an orthotics entity of footwear, a medical entity of footwear or a sales representative of footwear.

18. A system comprising:
one or more processors;
a scanning device communicatively coupled to the one or more processors and configured to capture data of a foot of a user, the foot data comprising at least one of an image, a video, depth information, pressure information or measurements;
memory communicatively coupled to the one or more processors and storing executable instructions that, when executed by the one or more processors, cause the one or more processors to perform operations comprising:
obtaining one or more user preferences for the user regarding footwear;
accessing a database storing footwear data for a plurality of footwear items, the footwear data specifying physical dimensions of the respective footwear item including an internal main axis footwear item length and an internal widest-point footwear item width;
determining a fit score for each of the plurality of footwear items by
(i) determining a difference between the internal main axis footwear item length and a foot length indicated by the foot data of the user,
(ii) determining a difference between the internal widest-point footwear item width and a foot width at a widest-point indicated by the foot data of the user,
(iii) determining a first weight for the difference of (i) based on the one or more user preferences,
(iv) determining a second weight for the difference of (ii) based on the one or more user preferences, and
(v) combining the first weight applied to the difference of (i) with the second weight applied to the difference of (ii);
determining which of the plurality of footwear items has a greatest fit score;
determining a recommendation based on the footwear item that has the greatest fit score; and
a display communicatively coupled to the one or more processors and configured to display the recommendation of the footwear item.

19. The system of claim 18, wherein the fit score indicates a level of fit of the footwear item.

20. The system of claim 18, wherein the one or more user preferences relate to at least one of a footwear tightness, a footwear arch, a footwear instep, a footwear toe box, a footwear heel, a footwear ankle support, a footwear shape, a footwear width, a footwear length, a type of footwear material, a footwear flexibility, a footwear use or a footwear style.

21. The system of claim 18, wherein the fit score is based on at least one of a foot condition or a medical condition of the user.

22. The system of claim 18, wherein the foot data includes a point cloud of a 3D representation of a foot, and wherein the one or more processors is configured to compare the footwear data for the plurality of footwear items to the point cloud.

* * * * *